(12) United States Patent
Shirokoshi

(10) Patent No.: US 10,215,259 B2
(45) Date of Patent: Feb. 26, 2019

(54) PLANETARY REDUCTION GEAR DEVICE

(71) Applicant: HARMONIC DRIVE SYSTEMS INC., Shinagawa-ku, Tokyo (JP)

(72) Inventor: Norio Shirokoshi, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 143 days.

(21) Appl. No.: 15/424,090

(22) Filed: Feb. 3, 2017

(65) Prior Publication Data

US 2017/0227091 A1    Aug. 10, 2017

(30) Foreign Application Priority Data

Feb. 8, 2016  (JP) ................................ 2016-022068

(51) Int. Cl.
*F16H 1/28* (2006.01)
*F16H 57/08* (2006.01)
*F16H 1/46* (2006.01)

(52) U.S. Cl.
CPC .............. *F16H 1/28* (2013.01); *F16H 57/08* (2013.01); *F16H 57/082* (2013.01); *F16H 1/46* (2013.01)

(58) Field of Classification Search
CPC .... F16H 1/28; F16H 57/082; F16H 2001/289; F16H 2001/327
See application file for complete search history.

(56) References Cited

U.S. PATENT DOCUMENTS

2006/0142114 A1*  6/2006  Fox ....................... F16H 1/2836
                                                 475/348

FOREIGN PATENT DOCUMENTS

JP         2002-031196 A       1/2002

* cited by examiner

*Primary Examiner* — Mark J Beauchaine
(74) *Attorney, Agent, or Firm* — Buchanan Ingersoll & Rooney PC

(57) ABSTRACT

A planetary reduction gear device has first and second planetary gears meshed with a sun gear and an internal at different locations in a direction of an axis line; and a carrier assembly for supporting the first and second planetary gears. The carrier assembly has a first planetary carrier for supporting the first planetary gears and a second planetary carrier for supporting the second planetary gears. The first and second planetary carriers are fixed coaxially with each other in the direction of the axis line so as to rotate integrally. A planetary reduction gear device having a large torque capacity can be obtained.

7 Claims, 2 Drawing Sheets

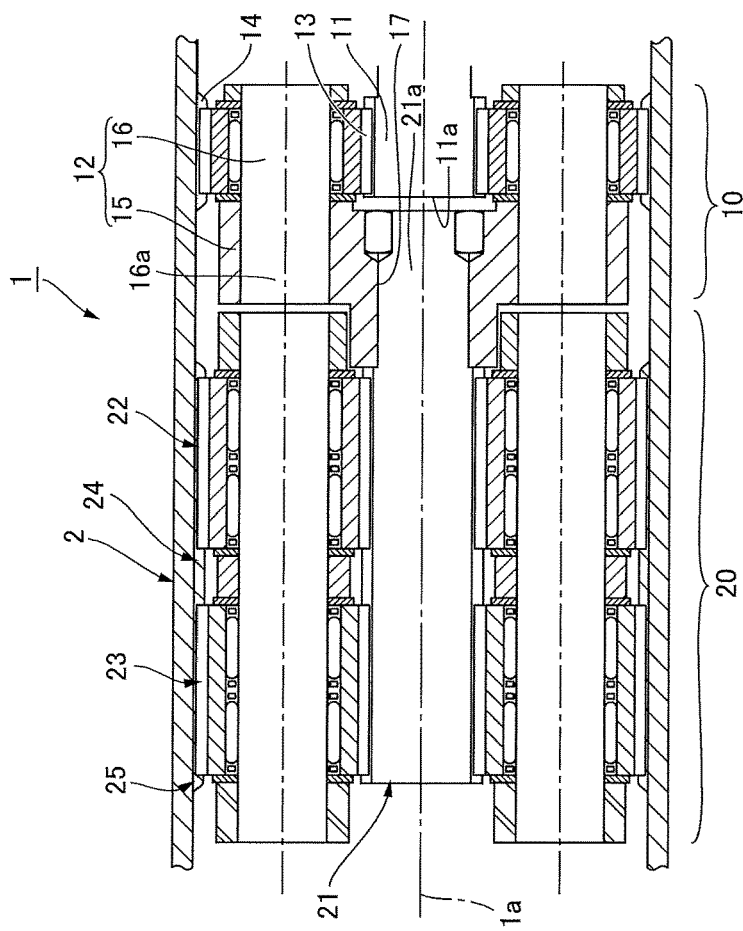
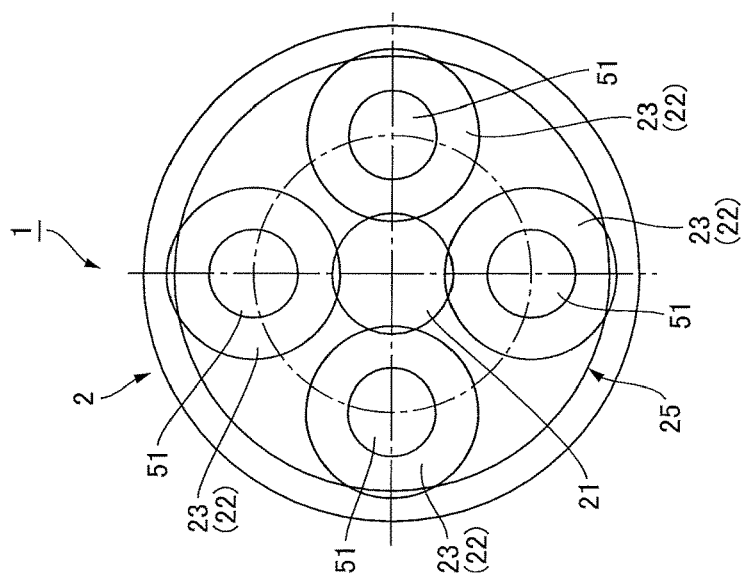
FIG. 1B
FIG. 1A

PLANETARY REDUCTION GEAR DEVICE

BACKGROUND OF THE INVENTION

Field of the Invention

The present invention relates to a planetary reduction gear device suited for a case in which the outer diameter of a planetary reduction gear device is restricted and at the same time a high torque capacity thereof is required.

Description of the Related Art

The inventor of the present invention proposes a small backlash planetary gear device in JP 2002-031196 A. In this device, there are provided two carrier plates for supporting planetary shafts that support planetary gears on both sides. The carrier plates are rotated relative with each other, whereby adjusting backlashes It is typically adopted to widen tooth width of the gears constituting a planetary gear device in a case in which a high torque capacity of the device is required under such a condition that the outer diameter thereof is restricted. However, there is a limit to increase the tooth width, and the torque capacity cannot be increased further more after the tooth width is increased to exceed a certain width. This is because widening of the tooth width makes a tooth-trace load distribution uneven, and it also makes the planetary shafts longer to decrease the strength thereof.

SUMMARY OF THE INVENTION

An object of the present invention is to provide a planetary reduction gear device capable of realizing a high torque capacity without increasing the outer diameter dimension of the gear.

To realize the above and other objects, according to the present invention, there is provided a planetary reduction gear device characterized by comprising:

a sun gear;

an internal gear;

at least first and second planetary gears that are meshed with the sun gear and the internal gear, meshing locations of the first planetary gear to the sun gear and the internal gear being different from meshing locations of the second planetary gear to the sun gear and internal gear in a direction of axis line; and a carrier assembly for supporting the first and second planetary gears, wherein the carrier assembly has a first planetary carrier for supporting the first planetary gear and a second planetary carrier for supporting the second planetary gear, and the first and second planetary carriers are fixed in a coaxial manner with each other from the direction of the axis line.

In the present invention, the first and second planetary gears supported by the carrier assembly are arranged in the direction of the axis line. Specifically, planetary gears having a narrow tooth width are arranged in the direction of the axis line so as to increase a torque capacity of the device. Whereby, it is possible to prevent the tooth-trace load distribution of the planetary gears from becoming uneven in comparison with a case where planetary gears having a wide tooth width are used to increase a torque capacity. Further, the first and second planetary carriers provided with the planetary shafts for supporting the planetary gears are integrally connected in the direction of axis line, so that the shaft part of each planetary shaft where each planetary gear is supported is short in length, whereby preventing decrease in the strength of the planetary shaft. Consequently, it is possible to realize a planetary reduction gear device that has a large torque capacity in comparison with a case where planetary gears having a wide tooth width are used.

In the planetary reduction gear device of the present invention, a plurality of the first planetary gears and a plurality of the second planetary gears may be provided. The first planetary gears are arranged at prescribed angular intervals in a circumferential direction between the sun gear and the internal gear. The second planetary gears are arranged at prescribed angular intervals in the circumferential direction between the sun gear and the internal gear. The first planetary gears are arranged at a first position, and the second planetary gears are arranged at a second position. The second position is a position that is different from the first position in the direction of the axis line.

In this case, it is preferable for the first planetary carrier to support the first planetary shafts at both sides thereof in a rotatable manner. Likewise, it is preferable for the second planetary carrier to support the second planetary shafts at both sides thereof in a rotatable manner.

The rigidity of the first and second planetary shafts for supporting the first and second planetary gears can be secured by supporting these planetary shafts in a manner supported on both sides thereof.

It is possible for the first planetary carrier to have a configuration in which the first planetary shafts are bridged between a first shaft support plate and a second shaft support plate, the first and second shaft support plates being located so as to sandwich the first planetary gears in the direction of the axis line. Likewise, it is possible for the second planetary carrier to have a configuration in which the second planetary shafts are bridged between a third shaft support plate and a fourth shaft support plate, the third and fourth shaft support plates being located so as to sandwich the second planetary gears in the direction of the axis line. In this case, the second and third shaft support plates located between the first and second planetary gears may be mutually connected to constitute an integrally-rotatable carrier assembly. Alternatively, a single common shaft support plate may be employed instead of the second and third shaft support plates.

In the planetary reduction gear device of the present invention, the number of the first planetary gears is generally set to be the same as the number of the second planetary gears, and the first and second planetary gears are respectively arranged at the same angular positions in the circumferential direction.

In this case, it is possible to use common shafts as the first and second planetary shafts. Specifically, a plurality of common planetary shafts are arranged so that they extend to pass through the second and third shaft support plates. In each of the common planetary shafts, a shaft portion corresponding to the first position in the direction of the axis line functions as the first planetary shaft, and a shaft portion corresponding to the second position in the direction of the axis line functions as the second planetary shaft.

In a case where the planetary reduction gear device of the present invention is used as a two-stage reduction gear device, in addition to the above-mentioned configuration, a front-stage planetary reduction gear device having a front-stage planetary gear, a front-stage planetary carrier for supporting the front-stage planetary gear and a front-stage sun gear may be arranged, and the front-stage planetary carrier may be fixed to the sun gear in a coaxial manner.

According to the planetary reduction gear device, a plurality of planetary gears are arranged in the direction of the axis line to increase the torque capacity thereof. Although the length of the reduction gear device in the direction of the axis line increases, the torque capacity can be increased without increase in the outer diameter dimension of the reduction gear device. Consequently, the planetary reduction gear device of the present invention is suited for use in a case where an outer diameter is restricted and at the same time a high torque capacity is required.

BRIEF DESCRIPTION OF THE DRAWINGS

FIGS. 1A and 1B are a schematic front view and a schematic longitudinal sectional view of a two-stage planetary reduction gear device according to the present invention, respectively.

DESCRIPTION OF THE EMBODIMENTS

Figure 2:
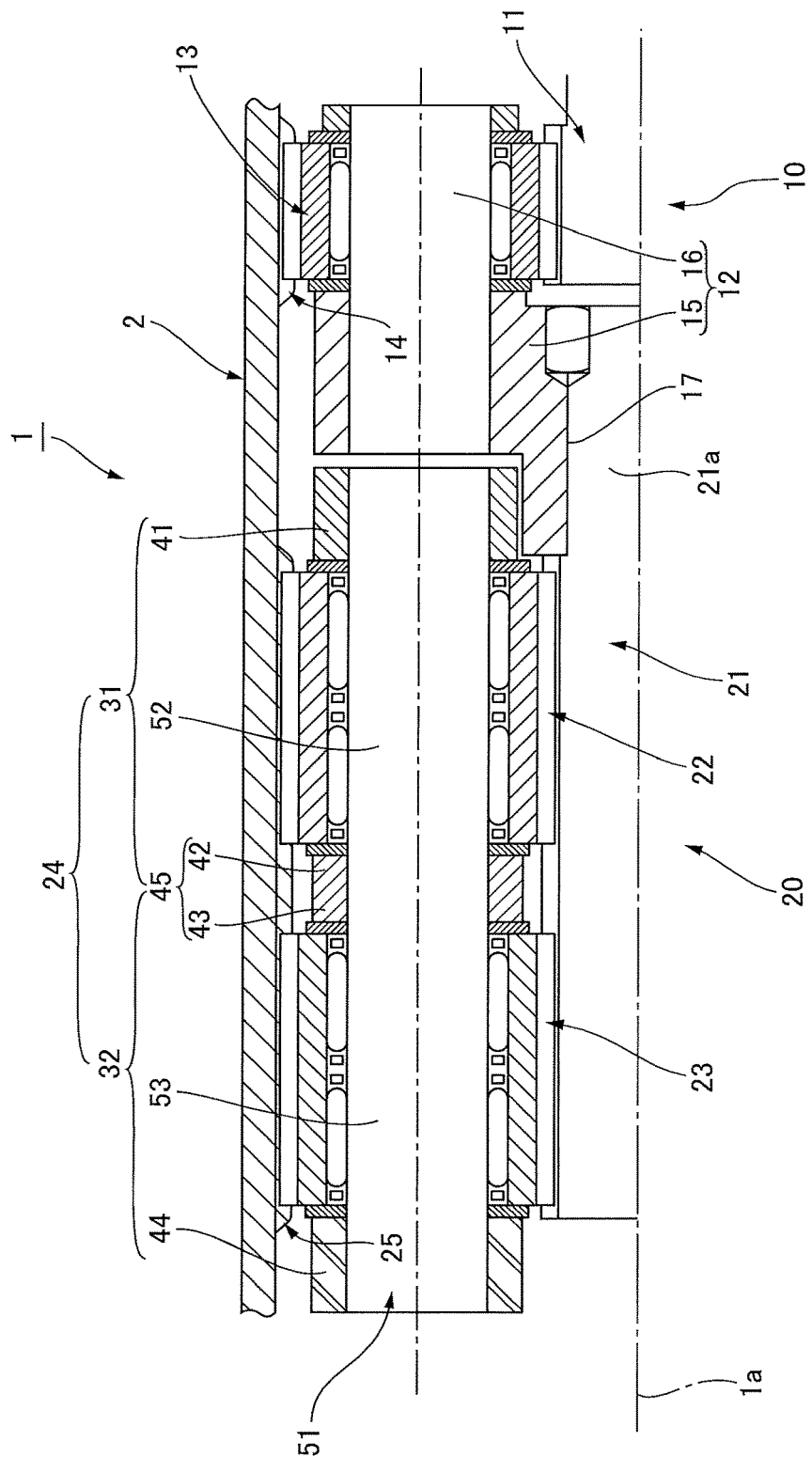
FIG. 2 is a partial enlarged longitudinal sectional view of the two-stage planetary reduction gear device of FIG. 1.

An embodiment of the planetary reduction gear device to which the present invention is applied will be described below, making reference to the accompanying drawings. The embodiment below relates to a two-stage planetary reduction gear device, but the present invention can be of course applied to a single stage planetary reduction gear device in the same manner. It is also noted that the number of planetary gears, the number and structure of planetary carriers to be connected, and other features are not limited to the present embodiment.

FIG. 1A is a schematic front view of the two-stage planetary reduction gear device according to the present embodiment, and FIG. 1B is a schematic longitudinal sectional view thereof.

FIG. 2 is a partial enlarged longitudinal sectional view of the two-stage planetary reduction gear device of FIG. 1. The two-stage planetary reduction gear device 1 has an annular device case 2, inside of which a front-stage planetary reduction part 10 and a rear-stage planetary reduction part 20 are coaxially assembled in the direction of the axis line 1a.

The front-stage planetary reduction part 10 has a front-stage sun gear 11, a plurality of front-stage planetary gears 13 arranged so as to surround the front-stage sun gear 11 at equal angular intervals on a same circle, a front-stage planetary carrier 12 for supporting the front-stage planetary gears 13, and a front-stage internal gear 14 formed integrally on the circular inner peripheral surface of the device case 2. The front-stage planetary carrier 12 has a shaft support disc 15 of a constant thickness, and a plurality of front-stage planetary shaft 16 fixed to the shaft support disc 15.

The shaft support disc 15 is arranged adjacent to the front-stage sun gear 11 in the direction of the axis line 1a in the device case 2. A circular press-fitting hole 17 is formed in the center portion of the shaft support disc 15, the center portion facing the shaft end face 11a of the front-stage sun gear 11 in a certain gap. Press-fitting shaft parts 16a of the front-stage planetary shafts 16 extending along the direction of the axis line 1a are press fitted and fixed to the outer-peripheral side portion of the shaft support disc 15 at equal angular intervals on the same circle. The respective front-stage planetary shafts 16 protrude toward the side of the front-stage sun gear 11 from the shaft support disc 15, and support the respective front-stage planetary gears 13 in a free rotatable state.

The rear-stage planetary reduction part 20 is arranged adjacent to the front-stage planetary reduction part 10 inside the device case 2. The rear-stage planetary reduction part 20 has a rear-stage sun gear 21, a plurality of first planetary gears 22, a plurality of second planetary gears 23, a carrier assembly 24 for supporting the first and second planetary gears 22 and 23, and a rear-stage internal gear 25. The first and second planetary gears are of the identical shape, and mesh with the rear-stage sun gear 21 and the rear-stage internal gear 25, respectively.

In this embodiment, the identical planetary gears are employed for the first and second planetary gears 22 and 23. Planetary gears having different tooth widths can be employed for the first and second planetary gears 22, 23. In addition, the same numbers of the first and second planetary gears 22, 23 are arranged at the same angular positions in the circumferential direction in the present embodiment. It is also possible to arrange different numbers of the first and second planetary gears. For example, the number of either one of the first and second planetary gears may be four, and the number of the other two. Further, the first and second planetary gears may be arranged at angular positions offset from each other in the circumferential direction. For example, three first planetary gears and three second planetary gears may be arranged in offset angular positions in the circumferential direction.

The shaft end part of the rear-stage sun gear 21 on the side of the front-stage planetary reduction part 10 is a press-fitting shaft part 21a. The press-fitting shaft part 21a is press fitted into the press-fitting hole 17 of the shaft support disc 15 of the front-stage planetary carrier 12, and is fixed thereto. The rear-stage sun gear 21 is a gear having a prescribed length (tooth width) in the direction of the axis line 1a, a gear section of the sun gear 21 (located on a first position) at the front-stage planetary reduction part 10 side in the direction of the axis line 1a is meshed with the first planetary gears 22, while the opposite side gear section of the sun gear 21 (located on a second position) is meshed with the second planetary gears 23. The rear-stage internal gear is also a gear having a prescribed length (tooth width) in the direction of the axis line 1a, and is meshed with both of the first and second planetary gears 22, 23.

As shown on FIG. 2, the carrier assembly 24 is an integral structure constituted by the first planetary carrier 31 and the second planetary carrier 32 that are connected and fixed coaxially from the direction of the axis line 1a so as to rotate integrally.

The first planetary carrier 31 is situated on the side of the front-stage planetary reduction part 10 with respect to the second planetary carrier 32 in the direction of the axis line 1a. The first planetary carrier 31 has annular first and second shaft support plates 41 and 42 both having a constant thickness. The first and second shaft support plates 41, 42 are located on both sides of the first planetary gears 22 in the direction of the axis line 1a. The other second planetary carrier 32 also has annular third and fourth shaft support plates 43 and 44 both having a constant thickness that are located on both sides of the second planetary gears 23. In this embodiment, a plate assembly 45 is formed by integrally coupling the second and third shaft support plates 42 and 43 located between the first and second planetary gears 22, 23. An annular common shaft support plate in a form of a single component part can be employed in place of the second and third shaft support plates 42 and 43.

Four common planetary shafts 51 are arranged to pass through the outer-peripheral side portions of the first to fourth shaft support plates 41 to 44. The common planetary shafts 51 are positioned at equal angular intervals in the circumferential direction of the same circle. The common planetary shafts 51 are formed with first planetary shaft portions 52 between the first and second shaft support plates 41 and 42, and the first planetary gears 22 are supported in a free rotatable manner on the first planetary shaft portions 52. The common planetary shafts 51 are also formed with second planetary shaft portions between the third and fourth shaft support plates 43 and 44, and the second planetary gears 23 are supported in a free rotatable manner on the second planetary shaft portions 53. Thus, the first and second planetary shaft portions 52 and 53 are supported on their both ends by these support plates 41 to 44.

In the two-stage planetary reduction gear device 1 of the present embodiment, the device case 2 is set to be a fixed element not to rotate, while the front-stage sun gear 11 is set to be a rotation input element where a high-speed rotation is inputted from a motor or another rotational source. The front-stage planetary carrier 12 of the front-stage planetary reduction part 10 outputs reduced rotation, which is inputted to the rear-stage sun gear 21 of the rear-stage planetary reduction part 20, and is further reduced in speed by the rear-stage planetary reduction part 20. The reduce-speed rotation obtained through the rear-stage planetary reduction part 20 is then derived from the fourth shaft support plate 44 of the carrier assemble 24 located on the end in the direction of the axis line 1a.

The rear-stage planetary reduction part 20 of the two-stage planetary reduction gear device 1 is provided with the first and second planetary gears 22 and 23 arranged in the direction of the axis line 1a to increase the torque capacity, instead of employing planetary gears having an increased tooth width. It is possible to prevent unevenness of the tooth-trace load distribution of the planetary gears. Further, the first and second planetary shaft portions 52 and 53 for supporting the first and second planetary gears 22 and 23 are short in length, and both ends of these shaft portions are supported by the carrier assembly 24 constituted by connecting and integrating the planetary carriers in multistage in the direction of the axis line. This can prevent decrease in the strength of the planetary shafts in comparison with a case where a long planetary shaft is employed so as to support planetary gears having a wide tooth width.

Accordingly, it is possible to realize a small diameter planetary reduction gear device having a large torque capacity in comparison with a case where planetary gears having a wide tooth width are employed.

What is claimed is:

1. A planetary reduction gear device comprising:
   a sun gear;
   an internal gear;
   at least first and second planetary gears meshed with the sun gear and the internal gear at different locations in a direction of an axis line; and
   a carrier assembly for supporting the first and second planetary gears, wherein
   the carrier assembly has a first planetary carrier for supporting the first planetary gear and a second planetary carrier for supporting the second planetary gear; and
   the first and second planetary carriers are fixed coaxially with each other in the direction of the axis line so as to rotate integrally, wherein
   a plurality of the first planetary gears and a plurality of the second planetary gears are provided;
   the first planetary gears are arranged at prescribed angular intervals in a circumferential direction on a first location in the direction of the axis line between the sun gear and the internal gear;
   the second planetary gears are arranged at prescribed angular intervals in a circumferential direction on a second location in the direction of the axis line between the sun gear and the internal gear, the second location being different from the first location in the direction of the axis line;
   the first planetary carrier supports a plurality of first planetary shafts on both sides of the first planetary gears, the first planetary shafts supporting the first planetary gears in a rotatable state; and
   the second planetary carrier supports a plurality of second planetary shafts on both sides of the second planetary gears, the second planetary shafts supporting the second planetary gears in a rotatable state.

2. The planetary reduction gear device according to claim 1, wherein
   the first planetary carrier has a first shaft support plate and a second shaft support plate located on both sides of the first planetary gears in the direction of the axis line, and the first planetary shafts are bridged between the first and second shaft support plates; and
   the second planetary carrier has a third shaft support plate and a fourth shaft support plate located on both sides of the second planetary gears in the direction of the axis line, and the second planetary shafts are bridged between the third and fourth shaft support plates.

3. The planetary reduction gear device according to claim 2, wherein
   the second and third shaft support plates located between the first and second planetary gears are connected with each other.

4. The planetary reduction gear device according to claim 2, wherein
   a single common shaft support plate is arranged in place of the second and third shaft support plates.

5. The planetary reduction gear device according to claim 4, further comprising:
   a front-stage planetary reduction part having a front-stage internal gear, a front-stage planetary carrier, a front-stage planetary gear supported in a rotatable manner by the front-stage planetary carrier, and a front-stage sun gear, wherein
   the front-stage planetary carrier is fixed in a coaxial manner to the sun gear.

6. The planetary reduction gear device according to claim 5, further comprising:
   an annular device case, wherein
   the internal gear is formed on one side of a circular inner peripheral surface in the direction of the axis line of the device case, and the front-stage internal gear is formed on the other side of the circular inner peripheral surface in the direction of the axis line.

7. The planetary reduction gear device according to claim 2, wherein
   the number of the first planetary gears is the same as the number of the second planetary gears; and
   the first and second planetary gears are arranged at same angular positions in the circumferential direction.

* * * * *